Oct. 11, 1960  W. A. HYLAND ET AL  2,955,833
HITCH DEVICE

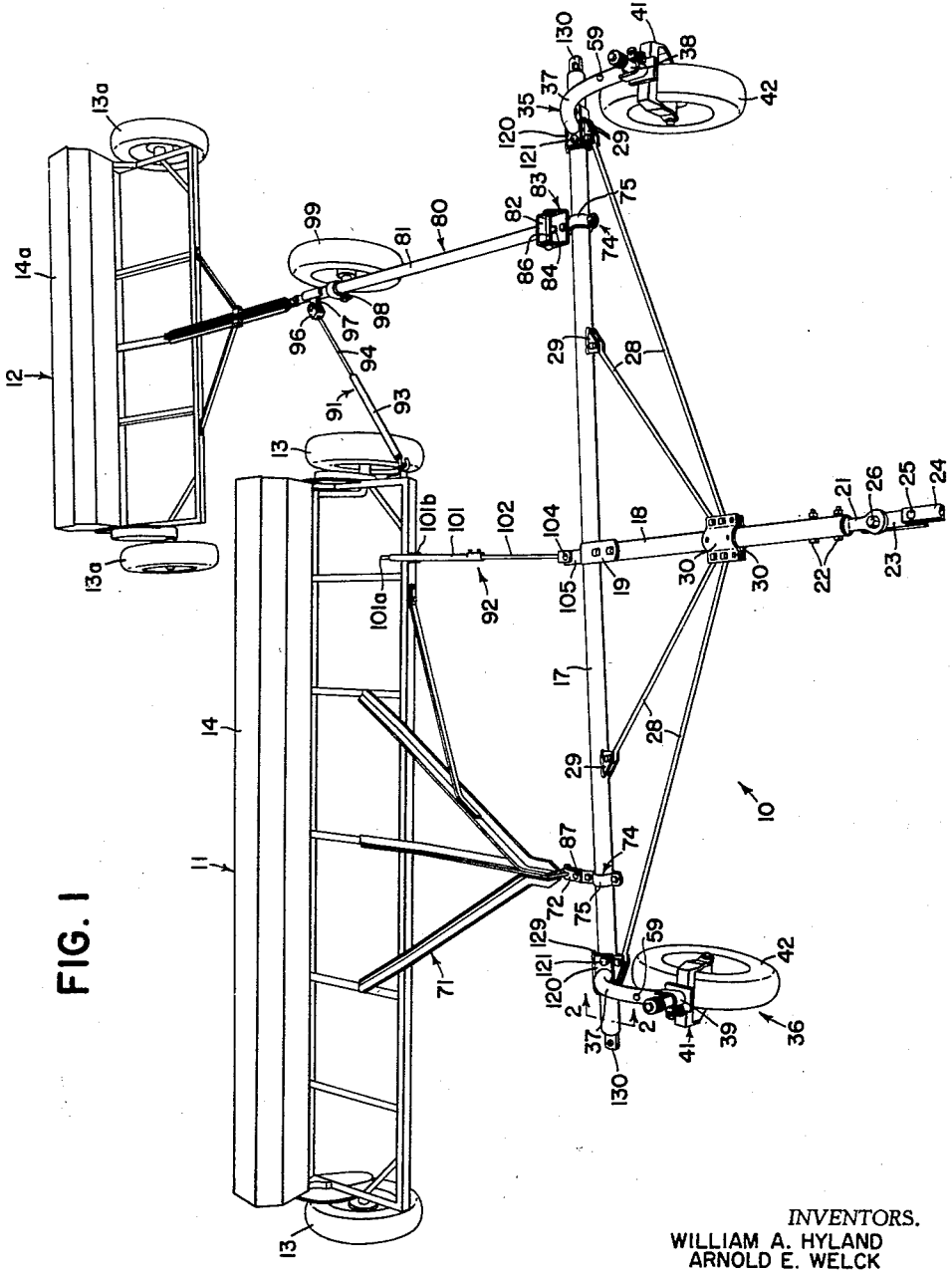

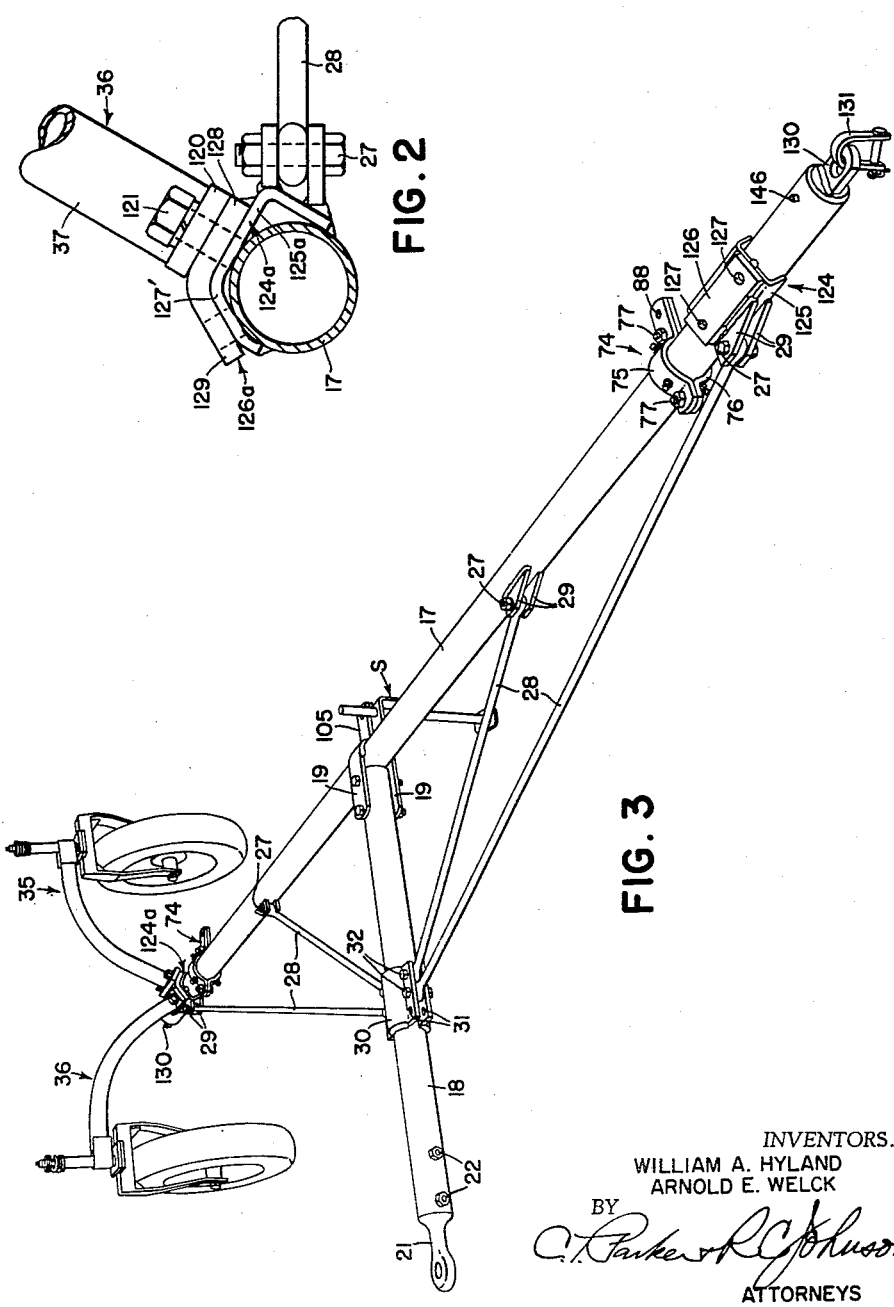

Filed Jan. 31, 1958  3 Sheets-Sheet 3

INVENTORS.
WILLIAM A. HYLAND
ARNOLD E. WELCK

ATTORNEYS

United States Patent Office 2,955,833
Patented Oct. 11, 1960

2,955,833
HITCH DEVICE

William A. Hyland and Arnold E. Welck, Horicon, Wis., assignors, by mesne assignments, to Deere & Company, a corporation of Delaware Filed Jan. 31, 1958, Ser. No. 712,352

4 Claims. (Cl. 280—34)

The present invention relates generally to agricultural implements and more particularly to hitches for a plurality of implements, such as grain drills, field cultivators and the like.

The object and general nature of the present invention is the provision of a new and useful hitch device especially adapted for use with implements that can be hitched together in endwise relation and also with implements that have end wheels and which therefore must be hitched together in staggered arrangement in order to provide for uniform ground coverage.

More specifically, it is a feature of this invention to provide means in the nature of a multi-unit hitch having caster wheels that may be locked so that castering is prevented, which adapts the hitch for use on steep hillsides and the like, and it is a further feature of this invention to provide a hitch with castering wheels that may be arranged for endwise transport and which may also be locked against castering when so arranged.

Still further, another feature of this invention is the provision of extension members for increasing the effective width of the draft device, as when larger units, or an increase in the number of units, must be accommodated, with means ensuring that the extension members will be properly alined with the main hitch frame and maintained in proper alignment therewith.

These and other objects and advantages of the present invention will be apparent to those skilled in the art after a consideration of the following detailed description, taken in conjunction with the accompanying drawings in which the preferred embodiment of our invention has been shown by way of illustration.

In the accompanying drawings:

Fig. 1 is a top perspective view of a hitch device and associated implements, in which the principles of the present invention have been incorporated.

Fig. 2 is an enlarged sectional view taken generally along the lines 2—2 of Fig. 1 and showing certain details of the caster wheel support mounting, and associated parts.

Fig. 3 is a perspective view of the hitch device of the present invention, showing the same as arranged for endwise transport.

Figure 5:
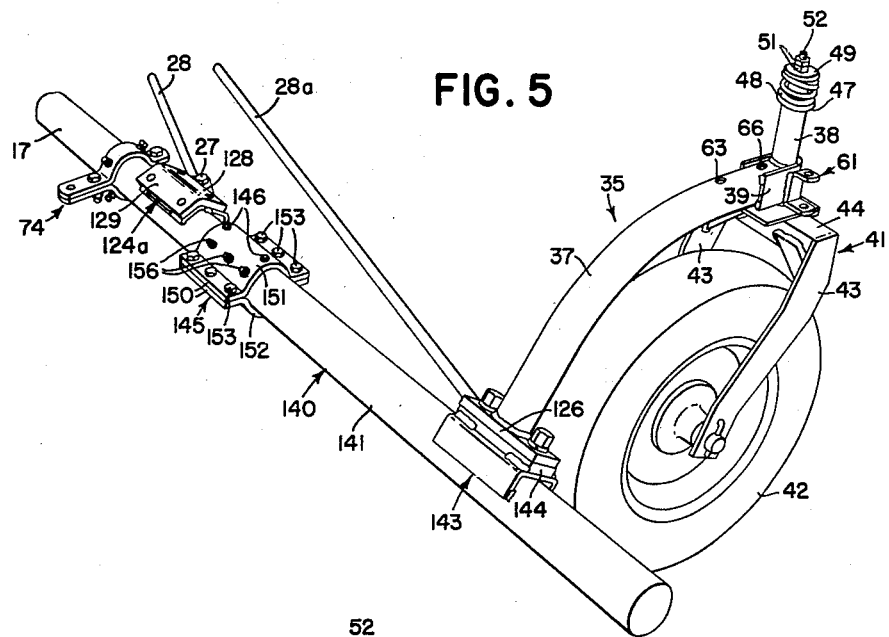
Fig. 5 is a fragmentary perspective view showing one of the extensions for the hitch device and the connection of a caster wheel support to the outer portion of the extension.

Referring first to Fig. 1, the multi-unit hitch of the present invention is indicated in its entirety by the reference numeral 10 and is shown as receiving a pair of end wheel grain drills 11 and 12, each grain drill having supporting wheels 13 and 13a disposed outwardly of the ends of the grain drill hoppers 14 and 14a. By virtue of this construction it is necessary to hitch the drills in staggered relation so as to provide for a uniform coverage over the wide area it is desired to drill. Reference to the particular hitch structure accommodating a staggered arrangement of the implements will be made below, as will also reference be made to the use of the hitch and its invention with implements that can be arranged in line, that is, in end to end relation, such as when the supporting end wheels are inside the ends of the frame. For example, two or more field cultivators may be arranged end-to-end or in aligned relationship to provide for high speed work over large acreages.

The hitch device 10 comprises a normally transversely extending frame member in the form of a pipe or tube 17 to the central portion of which a forwardly extending tongue 18 is connected by any suitable means, such as upper and lower straps 19 bolted or otherwise fixed to the rear end of the tongue 18. The latter extends forwardly and receives an eye member 21 that is secured, as by bolts 22, to the forward end of the tongue 18. Like the member 17, the tongue 18 is also in the form of a pipe or tubular member. The member 21 is preferably in the form of a casting and is adapted to receive an associated part 23 to which the draw bar 24 of the associated tractor is connected, as by hitch pin 25. Preferably, the member 23 is secured to the member 22 by bolt means 26. A plurality of brace rods 28 are connected, as by bolts 27, to the pipe member 17 through brackets 29 welded to or otherwise connected with the pipe member 17. The forward ends of the brace rods 28 are connected to the generally central portion of the tongue 18 by means of flanged plates 30 that are welded to the tongue 18 and have flanges that are apertured, as at 31 (Fig. 3), to receive pins or bolts 32 that connect the forward ends of the rods 28 to the plates 30. A plurality of openings 31 is provided so as to receive additional rods 28a, as when extension pipes are used (Fig. 5).

The pipe member 17 receives a pair of caster wheel assemblies 35 and 36. Each assembly comprises a curved pipe or arch member in the form of a caster support 37 that at its upper end is secured, as by welding, to a vertically disposed sleeve 38 (Fig. 4) that forms a pivot bearing, the connection being reinforced by a U-shaped strap 39 that forms connecting means between the sleeve 38 and the upper forward portion of the member 37. A caster wheel fork 41 receives a ground wheel 42 and includes two side sections 43 and an upper interconnecting section 44 to which a vertically extending spindle 45 is fixed, as by welding. Through suitable bearing means the spindle is mounted for oscillation within the supporting sleeve 38 and at the upper end of the sleeve 38 a spring supporting flange 47 is rigidly connected. The spindle 45 extends upwardly beyond the flange 47 and receives a compression spring 48, the upper end of which bears against an abutment washer 49 that is held in different positions of adjustment by lock nuts 51 screwed onto a threaded portion 52 that extends upwardly from the spindle 45. The spring 48 holds the caster wheel unit 41 against undesirable oscillation.

Figure 4:
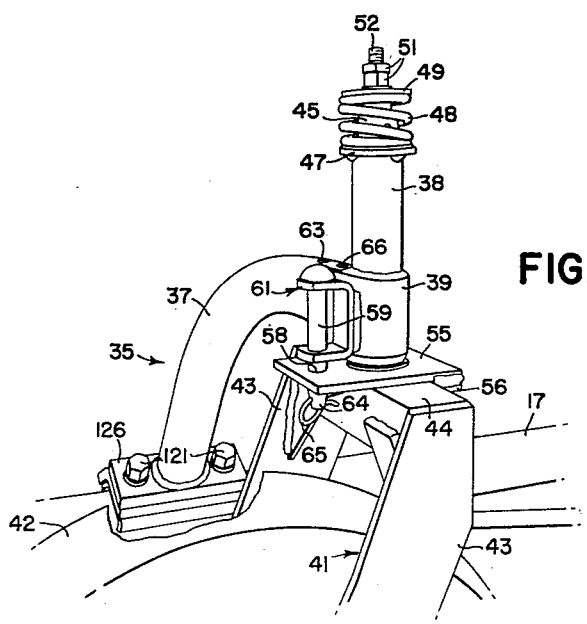
Fig. 4 is an enlarged fragmentary perspective view showing one of the caster wheel mountings and also the lock out means associated therewith for holding the caster wheel against castering, particularly in the endwise or transport position.

Forming a part of the caster wheel fork unit 41 is an upper plate 55 carrying a stop bar 56 against which the edge of the member 44 bears, whereby the upper plate 55 turns with the caster wheel fork 41 and spindle 45. The plate 55 is extended generally rearwardly and apertured, as at 58, to receive a locking pin 59 that may be disposed in a locking pin bracket 61 secured, as by welding, to one side of the strap member 39. As shown in Fig. 4, when the locking pin 59 is disposed in place and engages the opening 58 in the plate 55, the castering wheel assembly is locked against castering and the wheel 42 disposed generally parallel with the main pipe member 17. This holds the caster wheels in a position for transport, as shown in Fig. 3, and which will be referred to in detail below.

The caster wheel support 41 may be locked in other positions, as in a normal straight ahead position shown in Fig. 1 if conditions should require that castering be prevented, as for example, when operating on steep hillsides. Normally the locking pin 59 of each caster wheel unit 35 is carried in an opening 63 formed in the upper portion of the associated curved caster wheel support member 36. Carrying the locking pins 59 in the openings 63 disposes the pins out of the way of the caster wheel fork parts and thus accommodates free castering through 360°, yet the pins are conveniently available for locking the wheels against castering when desired. Each locking pin is provided with an apertured end 64 to receive a hair pin retainer 65 which holds the locking pin 59 either in an operative position, shown in Fig. 4, or in an idle position, as shown in Fig. 1.

Each caster wheel support 37 is provided with a second opening 66 (Fig. 5) located so that when the wheel fork 41 is swung around into its normal position (Fig. 1) the locking pin 49 can be inserted through the opening 66 and into the opening 58 in the plate 55 so as to lock the caster wheel against swinging, as when operating on steep hillsides or in other conditions where castering would be objectionable.

Referring again to Fig. 1, the forward implement 11 is provided with the usual hitch frame 71 and the latter is connected by hitch means 72 to a laterally adjustable clamp 74 that as shown in Fig. 3 comprises two parts 75 and 76 fixed about the main hitch frame pipe 17 by bolts 77. The clamp 74 may be shifted to a desired position along the pipe 17, either inside or outside the associated caster wheel unit 35 as required, according to the width of the machines or implements to be connected to the hitch 10. As shown in Fig. 1, the clamp 74 for the forward implement 11 is disposed inside the associated caster wheel assembly 36.

Where the implements, as indicated at 11 and 12 in Fig. 1, are disposed in staggered arrangement, we provide a new and improved hitch attachment 80 for connecting the rear implement 12 with the multi-unit hitch 10. The attachment 80 comprises a generally fore and aft extending pipe member 81 carrying a yoke 82 at its forward end that is pivotally connected with an attachment yoke 83 fixed at two points to the rear portion of the associated clamp 74. It will be observed from Fig. 3 that the two clamps 75 and 76 are extended rearwardly and are provided with a pair of rear openings, one of which receives the rear clamp bolt 77. When the attaching bracket 83 is to be used, it is fixed to the associated clamp 74 by the rear bolt 77 and by an additional bolt 84.

When the implements are arranged as shown in Fig. 1, they are maintained in the proper relative position laterally by means of two stabilizer rods 91 and 92. The stabilizer rod 91 comprises two telescopically adjustable parts 93 and 94, one hooked into and thereby pivotally connected with the adjacent portion of the frame of the forward implement 11. The rear end of the other part 94 is pivotally connected, as at 96, with an apertured lug 97 formed on or carried by the rear end of the member 81. The end wheel drill 12 is hitched to the rear end of the member 81 for lateral swinging, as may be necessary when turning the outfit. The rear end of the member 81 also carries a laterally extending bracket 98 carrying axle means on which a rear wheel 99 is journaled. The other stabilizer rod 92 is of similar construction, including two telescopically associated parts 101 and 102, the rear end 101a of the part 101 being formed as a hook and when in use is pivotally connected to a bracket 101b that is fixed in any suitable way to the adjacent portion of the forward implement 11. The other part 102 is pivotally connected, as at 104, to a rearwardly extending apertured hitch lug 105 that extends rearwardly from the central portion of the main hitch pipe 17. It will be seen from Fig. 1 that, although the drill 11 is held against lateral swinging relative to the hitch bar 17 by the link 92, the other drill 12 may swing laterally about its point of pivotal connection with the rear end of the pipe member 81, and the wheels 42 may caster. Therefore the outfit may readily be turned toward one side or the other without skidding the wheels 13, 13 and 99 to any material extent since the wheel 99 is disposed substantially in axial alignment with the wheels 13, 13 of the other drill 11.

When it is desired to transport the outfit as shown in Fig. 1, from one field to the other or under other conditions where the width of the two implements might be objectionable, after disconnecting the adjustable rods 91 and 92 one of the implements may be hitched directly to the center lug 105 and then the other implement may be hitched behind the first implement. If the conditions are such that it is not desired to have the wheels 42 caster, the locking pins 59 may be removed from the openings 63 and inserted through the openings 66 and into the openings 58 in the wheel forks 41 to hold the wheel in their normal position, as shown in Fig. 1. However, if it should be desired to transport the outfit along narrow lanes, highway, and the like, the width of the outfit may further be reduced by arranging the hitch unit 10 for endwise transport, as indicated in Fig. 3.

Each caster wheel assembly 35 is connected to the main hitch pipe member 17 in the following manner. An attaching plate 120 is welded to the lower end of each caster wheel support member 37 and is apertured to receive a pair of attaching cap screws 121. Welded to one end of the pipe member 17 is an attaching bracket 124 that includes a channel like part 125, the flanges of which are welded directly to the pipe member 17, and an attaching bracket plate 126 that is provided with a pair of tapped openings 127 into which the cap screws 121 are adapted to be threaded.

As shown in Fig. 2 and the upper portion of Fig. 3, the other end of the pipe member 17 is provided with a dual wheel support attaching bracket 124a so that this end of the pipe member 17 is adapted to receive a second wheel assembly, such as the assembly 35, when the hitch device is arranged for endwise transport, as best shown in Fig. 3. The dual wheel support attaching bracket 124a, best shown in Fig. 2, comprises a channel-like part 125a welded to the end of the pipe 17 opposite the end receiving the other attaching bracket 124. The part 125a includes an angled section 127' receiving an angle attaching bracket plate 126a having two tapped portions 128 and 129. The portion 128 lies in the same plane as the attaching bracket plate 126 (Fig. 3) and receives the wheel assembly 36. The other portion 129 receives the other wheel assembly 35 when it is moved to the position shown in Fig. 3 to arrange the hitch unit for endwise transport. The portion 128 and associated parts, and the attaching bracket 124 and associated parts, form main wheel support receiving brackets that are used during normal operation, as shown in Fig. 1, and the other portion 129 and associated parts form an auxiliary bracket receiving the shiftable wheel assembly when the hitch is arranged for endwise transport, as shown in Fig. 3. When thus arranged, a stand S may be used to support the hitch unit when it is not in motion.

It is therefore a simple matter to arrange the hitch device of the present invention for endwise transport. All that is necessary to do is to remove the left hand caster wheel assembly 35 (right hand portion of Fig. 1) and attach it to the other end of the frame pipe member 17 opposite the caster wheel assembly 36 that is normally fixed to that end of the member 17.

Each end of the pipe member 17 is provided with a hitch part 130 the apertured portion of which is adapted to receive a conventional hitch clevis 131. It will be seen from Fig. 3 that the hitch part 130 is disposed at least partially within the end of the pipe member 17 and that the part 130 lies wholly within the extended cylindrical surface of the pipe 17. As will be explained below, this is arranged in this way so as to provide for the convenient attachment of a pipe extension when a wider hitch is desired, as indicated in Fig. 5. Such a wider hitch may be necessary when the larger sizes of implements are used or if a number greater than two are to be used.

From Fig. 3 it will be seen that the lugs 29, to which the outer ends of the longer braces 28 are connected, are welded to the forward sides of the channel-like members 125 and 125a.

Each of the pipe members 17 may receive an extension 140 that is shown in detail in Fig. 5. Each extension includes an extension pipe member 141 open at its inner end so as to pass over the associated hitch part 130. The outer portion of the extension member 140 is provided with a caster wheel attaching bracket 143, which includes an attaching plate 144 substantially the same dimensionally as the caster wheel support bracket plate 126 shown in Fig. 3 and the attaching plate portion 128 shown in Fig. 2. Thus, as best shown in Fig. 5, when either or both of the extensions 140 are to be used, the adjacent caster wheel assembly 35, or 35a, is removed from the associated bracket 124 or 124a, the extension 140 attached to the pipe member 17 and the disconnected caster wheel assembly fixed to the extension attaching bracket 143. When the extensions 140 are used, it is desirable to add a third set of brace rods 28a, connecting them to suitable lugs such as those shown as fixed to the channel members 125 and 125a on the extension attaching brackets 143 and to pivot means inserted in the openings 31.

In order to insure proper alinement and the secure attachment of each extension 140 to the main frame member 17, we provide pairs of clamp plates 145. The upper plate of each pair is apertured to receive a pair of locating pins 146 on each outer end portion of the member 17. Also, the clamp plates 145 have apertured flanges 150 to receive clamping bolts 153. To further insure secure attachment and to prevent the development of any looseness, one of the clamp plates of each pair is tapped and threaded to receive set screws 156 that, when tightened, makes the clamping action of the plates 151 and 152 more secure.

What is claimed is:

1. A multiple implement hitch device comprising a normally transverse frame bar, hitch means connected to the generally central portion of said transverse frame bar, a first wheel support receiving bracket attached to each end portion of said frame bar, a wheel and wheel support connected with each bracket, one of said supports at one end of said bar being detachable from the associated bracket, a second or auxiliary wheel support receiving bracket on the other end portion of said frame bar disposed adjacent the first mentioned bracket at that end of the bar, said last-named bracket and said second or auxiliary bracket, and the associated wheel supports, being so constructed and arranged that the wheels carried by said associated wheel supports are disposed on opposite sides of said transverse bar when both wheels are mounted at the same end of said frame bar, said auxiliary bracket receiving said detachable wheel support when said frame bar is arranged for endwise transport and said wheels being caster wheels, whereby when said wheel supports are connected to said first and second brackets the caster wheels may swing into a position to accommodate endwise movement of said frame bar, and means at the other end of said frame bar to receive propelling and supporting means.

2. A multiple implement hitch device comprising a normally transverse frame bar, hitch means connected to the generally central portion of said transverse frame bar, a wheel support receiving bracket attached to each end portion of said frame bar, a wheel support connected with each bracket, and each wheel support including a lower base portion attachable to the associated bracket and an upper laterally extending wheel-receiving portion that, when the wheel support is attached to the associated bracket, extends generally transversely outwardly from the frame bar, one of said supports at one end of said frame bar being detachable from the associated bracket, a castering wheel connected with each support, and an auxiliary wheel support receiving bracket on the other end portion of said frame bar disposed adjacent the first mentioned bracket at that end of the bar, said auxiliary bracket receiving said detachable wheel support when said frame bar is arranged for endwise transport and said auxiliary bracket and the adjacent bracket being spatially arranged so that the associated wheel supports extend in generally opposite directions relative to the frame bar.

3. A multiple implement hitch device comprising a normally transverse frame bar, hitch means connected to the generally central portion of said transverse frame bar, a wheel support receiving bracket fixed to each end portion of said frame bar, each bracket facing upwardly and rearwardly at an angle to the horizontal and relative to the line of travel in normal operation, a wheel support connected with each bracket, each wheel support including a generally horizontal normally forward portion and a downwardly and rearwardly extending portion to the lower end of which an attaching plate is fixed, the latter being shaped to receive the associated wheel support receiving bracket, an auxiliary wheel support receiving bracket fixed to one end portion of the frame bar closely adjacent the wheel support receiving bracket fixed to said one end, said auxiliary bracket facing upwardly and forwardly at an angle to the horizontal and relative to the line of travel in normal operation, said latter angle being substantially equal to said first named angle, means removably fixing the attaching plate of the wheel support at the other end of said frame bar to the bracket at said other end or to said auxiliary bracket, optionally, and a castering ground wheel carried by the outer end of each wheel support.

4. The invention set forth in claim 3, further characterized by said auxiliary bracket and the adjacently disposed bracket including an angled attaching bracket plate having two portions disposed at an angle to one another, one portion lying substantially in the same plane as the corresponding portion of the bracket at the other end of said frame bar.

References Cited in the file of this patent

UNITED STATES PATENTS

| | | |
|---|---|---|
| 1,016,381 | Watson | Feb. 6, 1912 |
| 1,319,235 | Messersmith | Oct. 21, 1919 |
| 1,721,694 | Graham | July 23, 1929 |
| 1,722,585 | Manley | July 30, 1929 |
| 1,762,919 | Drabek | June 10, 1930 |
| 1,906,753 | Johnson | May 2, 1933 |
| 1,941,539 | Court | Jan. 2, 1934 |
| 1,963,426 | Taylor | June 19, 1934 |
| 2,652,674 | Lee | Sept. 22, 1953 |
| 2,658,770 | Koenig | Nov. 10, 1953 |
| 2,681,231 | Kondracki | June 15, 1954 |
| 2,696,772 | Underdown | Dec. 14, 1954 |
| 2,709,086 | Magee et al. | May 24, 1955 |
| 2,735,251 | Dlugosch | Feb. 21, 1956 |
| 2,736,567 | McMurray | Feb. 28, 1956 |
| 2,806,707 | Christie | Sept. 17, 1957 |

FOREIGN PATENTS

| | | |
|---|---|---|
| 691,526 | Great Britain | May 13, 1953 |